Figure 1:
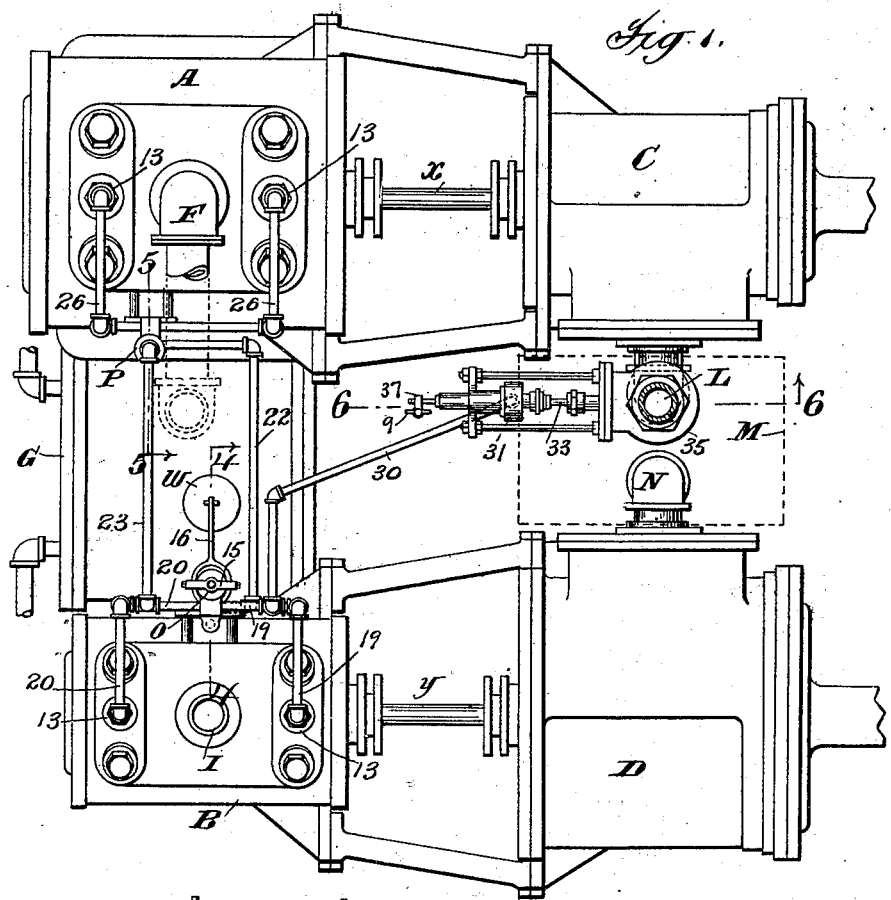

No. 664,562. Patented Dec. 25, 1900.
G. DE LAVAL & G. P. ABORN.
UNLOADING MEANS FOR AIR COMPRESSORS.
(Application filed Apr. 3, 1900.)

(No Model.) 2 Sheets—Sheet 1.

Attest:
P. A. Kehoe
J. A. Traver

Inventors.
George De Laval
George P. Aborn
By Philipp, Phelps &
Sawyer
Attys

THE NORRIS PETERS CO., PHOTO-LITHO., WASHINGTON, D. C.

No. 664,562. Patented Dec. 25, 1900.
G. DE LAVAL & G. P. ABORN.
UNLOADING MEANS FOR AIR COMPRESSORS.
(Application filed Apr. 3, 1900.)
(No Model.) 2 Sheets—Sheet 2.
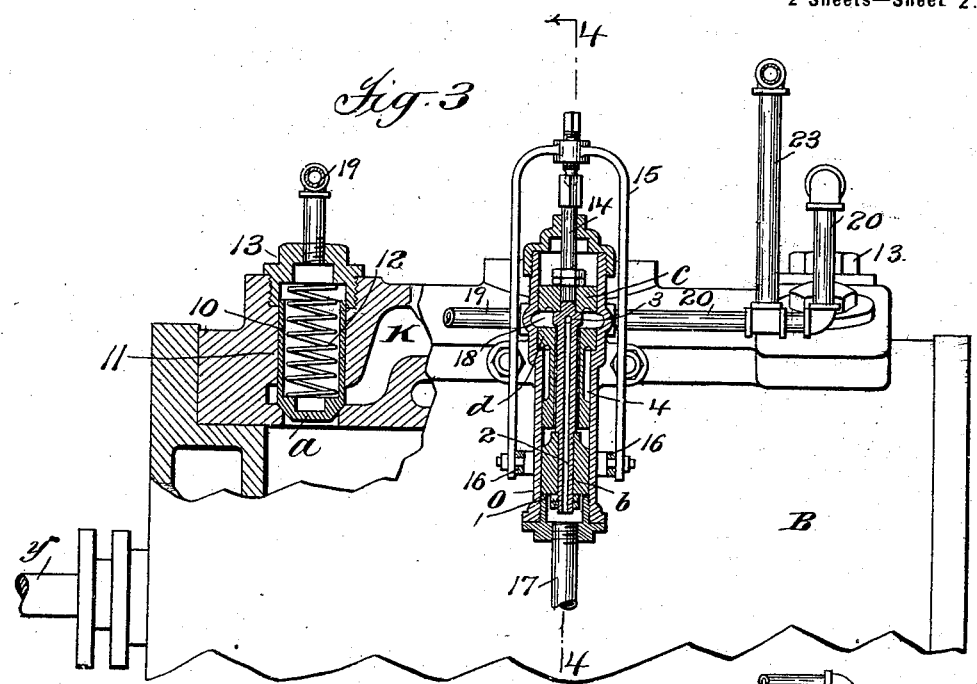
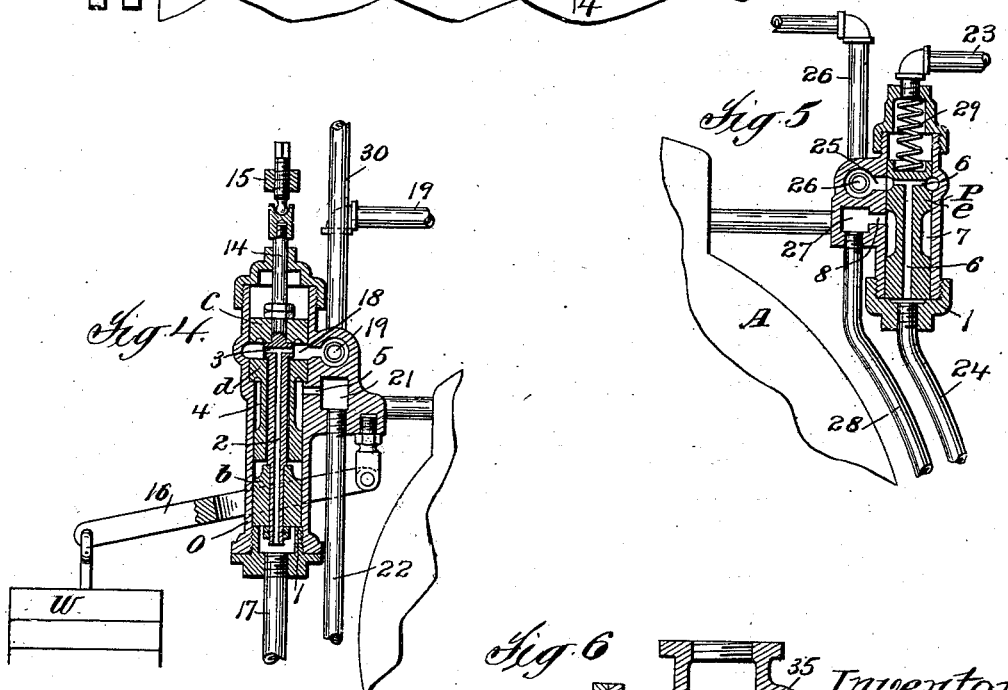
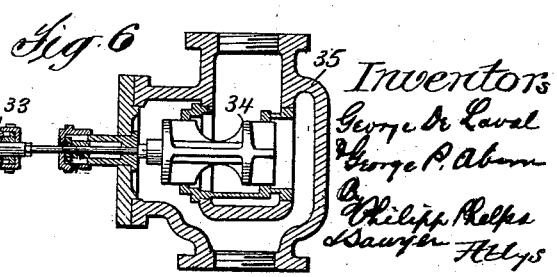

UNITED STATES PATENT OFFICE.

GEORGE DE LAVAL, OF CAMBRIDGE, AND GEORGE P. ABORN, OF BOSTON, MASSACHUSETTS, ASSIGNORS TO THE GEORGE F. BLAKE MANUFACTURING COMPANY, OF NEW YORK, N. Y.

UNLOADING MEANS FOR AIR-COMPRESSORS.

SPECIFICATION forming part of Letters Patent No. 664,562, dated December 25, 1900.

Application filed April 3, 1900. Serial No. 11,281. (No model.)

*To all whom it may concern:*

Be it known that we, GEORGE DE LAVAL, a resident of Cambridge, Middlesex county, and GEORGE P. ABORN, a resident of Boston, Suffolk county, State of Massachusetts, citizens of the United States, have invented certain new and useful Improvements in Unloading Means for Air-Compressors or the Like, fully described in the following specification and the accompanying drawings, forming a part of the same.

In the operation of single-stage air-compressors it is common to provide unloading means by which the further compression of air is stopped and the load upon the compressor-piston relieved when the air in the receiver, such as a tank or any pipe system, exceeds the pressure desired, and provision for thus stopping the compression of air and relieving the load upon the compressor-piston in case of any such excess of pressure and resuming compression or reloading the piston when the receiver-pressure is again reduced has been made in various ways, as by opening and closing a connection between the opposite ends of the cylinder, through which the air may circulate without compression, opening and closing a relief-valve to the atmosphere or to an auxiliary receiver and otherwise.

The object of the present invention is to provide a multiple-stage air-compressor with unloading means, so as to secure the proper unloading of all the pistons when the receiver-pressure exceeds the pressure desired, so that the unloading and loading of the piston or pistons of the lower-pressure cylinder or cylinders shall be controlled by the unloading means for the high-pressure cylinder in such a manner as to assure the proper action of the other cylinders in relation to the high-pressure cylinder. We secure the result desired by combining or connecting the unloading means for the high-pressure cylinder and for the lower-pressure cylinder or cylinders, so that the action of the final-receiver pressure controls not only the unloading means for the high-pressure cylinder, but also in connection with the pressure from the lower-pressure or intermediate receiver or receivers controls the unloading means for the lower-pressure cylinder or cylinders. We may combine or connect the unloading means for the high and lower pressure cylinders in different ways and secure the result desired; but in controlling the unloading means for the lower-pressure cylinder or cylinders we preferably apply the final-receiver pressure and the pressure from the intermediate or lower pressure receiver for any cylinder in opposition to each other and in such a manner that on the operation of the unloading means for the high-pressure cylinder this final-receiver pressure, opposed by the intermediate-receiver pressure, is immediately cut off or reduced, so that the intermediate-receiver pressure operates the unloading means for the low-pressure cylinder.

The invention, broadly considered, may be applied in connection with different systems for automatically throwing off the load from the compressor-pistons when the final-receiver pressure is in excess of that desired and throwing it on again when this receiver-pressure falls to or below the normal amount; but we preferably employ a construction in which the action of the unloading means is to open passages of ample size between the two ends of the compression-cylinders, through which the air may circulate freely without work being done until the fall of pressure in the air-receiver operates through the unloading means to close the passages for resuming compression. Various forms of devices also may be employed in the unloading means; but in connection with our broad invention of applying unloading means to multiple-stage air-compressors we have made also certain improvements in unloading devices which form in themselves specific parts of the present invention and are applicable generally in connection with compressors whether single or multiple stage.

The present invention is intended for use in connection with either steam or power driven air-compressors where the work is intermittent or the final pressure liable for other reasons to exceed the pressure desired; but when the invention is applied in connection with a steam-driven compressor we preferably combine with it a steam-regulator so arranged that when the unloading means is brought into action to unload the compressor-pistons the steam-supply to the engine is cut off or reduced, preferably being nearly shut off, so that only a sufficient amount of steam is admitted to keep the compressor-pistons in motion, and when compression is resumed the proper supply of steam is again admitted.

As a full understanding of the invention can best be given by a detailed description of a construction embodying the same, such a description will now be given in connection with the accompanying drawings, showing a two-stage steam-driven compressor embodying the invention in its preferred form as applied in connection with unloading the pistons by connecting the cylinder ends for the circulation of the air without compression, and the features forming the invention will then be specifically pointed out in the claims.

Figure 2:
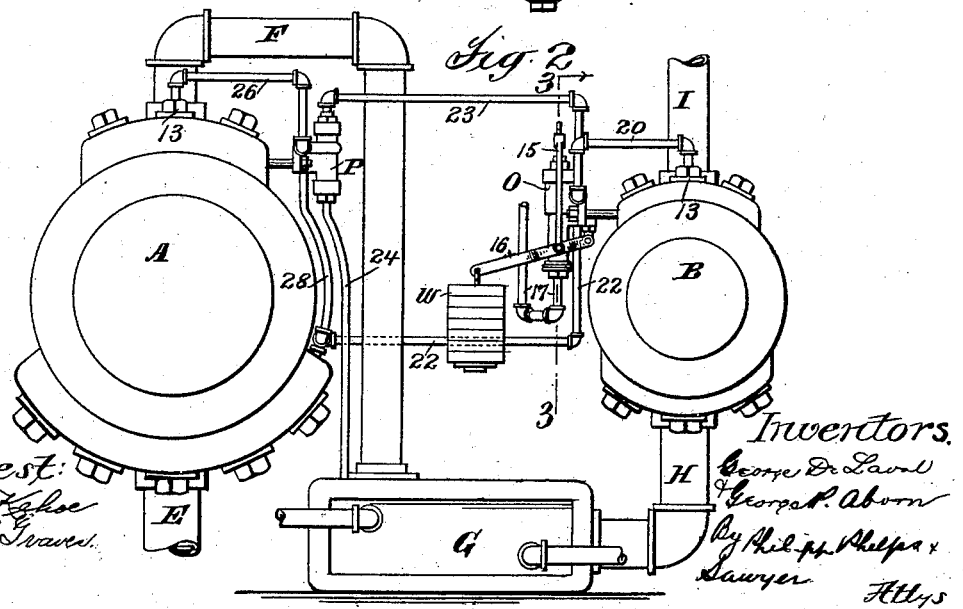

In the drawings, Figure 1 is a plan view of the compressor. Fig. 2 is an end elevation. Fig. 3 is a vertical section on the line 3 of Fig. 2. Figs. 4, 5, and 6 are vertical sections on respectively the lines 4, 5, and 6 of Fig. 1.

Referring to said drawings, A is the low-pressure and B the high-pressure cylinder of the two-stage air-compressor, the pistons of which are actuated through rods $x$ $y$ from the pistons of high and low pressure steam-cylinders C D, the engine shown being a cross-compound steam-engine, although it will be understood that this is immaterial in respect to the present invention. The compressor-cylinder A has the suction-pipe E and delivery-pipe F and through the latter delivers to the intermediate receiver or intercooler G, from which the high-pressure air-cylinder B takes its suction through suction-pipe H, and this cylinder delivers through pipe I to the final receiver or pipe system. The cylinders A B are shown as having top discharge-valves connecting the cylinders with delivery-passages K, leading to delivery-pipes F I.

The discharge-valves $a$, of which one is shown in section in Fig. 3, are of a common form, with cylindrical extensions forming pistons 10, moving in cylinders 11, so that fluid-pressure may be applied to these pistons, tending to close the valves, in addition to the light closing-springs 12, and these pistons seat tightly against the screw-plugs 13, forming the ends of the cylinders 11 when the valves are open, so as to prevent air leaking past the pistons and to the back of the valves. All the discharge-valves of the two cylinders A B to which pressure is applied in connection with the unloading means are of the same form, and the construction of each of the two cylinders in respect to these valves and the passages K is the same. As shown in the drawings, the unloading means acts in conjunction only with one discharge-valve at each end of each cylinder; but it will be understood that fluid-pressure may be applied to all or any number of the discharge-valves and controlled so as to form a part of the unloading means, in accordance with the size and character of the compressor and the result desired. It will be understood also that the position and form of the discharge-valves and delivery-passages may be varied widely and that the suction-valves, which are not shown, may be of any suitable form.

The high-pressure steam-cylinder C takes its steam through the induction-pipe L, on which is placed the regulator, hereinafter described, and this high-pressure cylinder C exhausts into receiver M, (indicated in dotted lines,) from which the low-pressure cylinder D takes its steam through pipe N, all as usual in cross-compound steam-engines.

Referring now to the unloading means used in connection with the general features of the air-compressor above described, there is mounted at one side of the high-pressure cylinder B a cylinder or barrel O, in which move two plungers $b$ $c$, secured in fixed positions on a plunger-rod 14, with a third plunger $d$ forming a valve mounted loosely on the rod 14 between the plungers $b$ $c$. The plunger-rod 14 is connected by a yoke 15 to a lever 16, on which are suspended the weights $w$, which exert downward pressure upon the rod 14 and determine the receiver-pressures at which the unloading means will be operated to unload and load the cylinders. The plunger $b$ has a seat 1 at the bottom of the cylinder O, upon which seat it rests in its normal position, and the receiver-pressure is applied below the piston $b$ through pipe 17, connecting with the receiver or pipe system, (not shown,) and the receiver-pressure from pipe 17 in the normal position of the parts when the compressor is working is admitted also through the central port 2 in the hollow rod 14 and transverse ports 3 to a chamber 18, with which connect pipes 19 20, connecting with the tops of the cylinders 11 on the high-pressure cylinder B and through which the receiver-pressure is normally applied to pistons 10 in a direction tending to close the discharge-valves $a$. The receiver-pressure in chamber 18, acting upon the upper side of the valve $d$, is balanced by the pressure on the under side of plunger $c$. The upper end of the valve $d$ is larger than the lower end, and the shoulder thus formed seats upon an internal shoulder in the chamber O, the valve thus being seated by the pressure due to the difference in diameter of the opposite ends of the valve. As above stated, the valve $d$ is loose on the rod 14, so as to have a small amount of play transversely to and longitudinally of the rod 14, so that the valve may seat independently of the plunger $b$, and a proper seating for both the plunger and the valve is thus secured without regard to wear or inaccuracy of fitting. The valve $d$ has a marginal port 4 extending longitudinally of the valve and connecting through port 5 in the cylinder-wall with a chamber 21, having a connection through pipe 22 with the suction-chamber of the low-pressure cylinder A, the port 4 being of such length that when the valve $d$ is raised by the movement of plunger $b$ under an excess of receiver-pressure the chamber 18 is connected through this port 4 with the port 5 and chamber 21, and thus the pressure in the pipes 19 20 and back of the valves $a$ of the high-pressure cylinder is reduced to the suction-pressure of the cylinder A or the atmosphere. From the pipe 20, which normally contains air under receiver-pressure from pipe 17 through the connections just described, pipe 23 extends across the space between the two cylinders A B and connects with the top of a cylinder P, mounted at the side of the low-pressure cylinder A, and there acts upon the top of a plunger $e$, forming a valve, the opposite or lower end of which valve $e$ is acted upon by pressure from the intermediate receiver G, admitted through pipe 24, connecting with the bottom of the cylinder P. This valve $e$ also has a seat 1 upon which it rests in its normal position, as in the case of the plunger $b$ of cylinder O. The intermediate-receiver pressure from pipe 24 is also admitted through ports 6, extending through valve $e$ to a chamber 25, with which connect pipes 26, through which pressure from the intermediate receiver is applied to the pistons on the discharge-valves of the low-pressure cylinder A in the same manner as previously described in connection with the valves of the high-pressure cylinder B and shown in Fig. 3. The valve $e$ also has the longitudinal marginal port 7, which connects through port 8 with a chamber 27, which has a connection with the suction-chamber of the cylinder A through pipe 28, and the port 7 of valve $e$ is made of such length as to connect chamber 25 with port 8 and chamber 27 when the valve $e$ is forced upward by the pressure from the intermediate receiver through pipe 24 on the release of the final-receiver pressure on top of the valve $e$, as hereinafter described, so as to reduce the pressure on the backs of the discharge-valves of the low-pressure cylinder A to the suction-pressure of that cylinder or the atmosphere. A light spring 29 acts upon the top of the valve $e$, tending to force it downward in addition to the final-receiver pressure from pipe 23, this spring acting to move and hold the valve down in its normal position when the excess of pressure on the lower side of the valve $e$ is not sufficient to overcome the spring-pressure, thus assuring the proper normal position of the valve in starting the compressor.

The construction thus far described is complete as an unloading means and may be used without a regulator for the steam-supply, even in steam-driven compressors, or any suitable form of regulator for the steam-supply may be used with this unloading means, and it will be understood that this unloading means may be used also with power-driven compressors of various classes. In the case of steam-driven compressors, however, it is desirable that the steam-supply shall be cut off or nearly cut off, so that just enough steam shall be admitted to overcome the friction of the parts and keep the engine running when the compressor-cylinders are unloaded and that the proper supply of steam shall be admitted again when the work of compression is resumed, and we have shown a simple construction of steam-regulator for this purpose combined with and controlled by the unloading means. In this construction the pipe 19, which normally is under the receiver-pressure, as previously described, connects through pipe 30 with a small cylinder 31, and there acts upon a piston 32 on the valve-rod 33 of a balanced valve 34 in the valve-casing 35 on the admission-pipe L, so as to tend to open the valve for the supply of steam to the high-pressure cylinder C. Upon the valve-rod 33 acts also a spring 36, tending to close the valve, and the valve-rod 33 extends outside the cylinder 31 and carries on its screw-threaded end a stop 37, which is formed by a split nut adapted to be locked in any position by the thumb-screw 9, so that it may be adjusted to the proper position on rod 33 to secure just the desired admission of steam through valve 34 when the receiver-pressure in cylinder 31 is relieved and the valve moved toward its closed position by spring 36, the amount of such closing movement being determined by the engagement of the stop 37 with the end of the cylinder 31.

The operation of the unloading means and steam-regulator is as follows: All the parts are shown in the drawings as in their normal position, with the compressor-cylinders working and the full steam-supply admitted through valve 34. Assuming now that the pressure in the final receiver with which pipe 17 connects reaches the excessive pressure at which the unloading means is to be called into operation to unload the cylinders, the first effect of this excessive pressure acting through pipe 17 upon the bottom of the plunger $b$ is to raise this plunger and rod 14 against the resistance of weights $w$ on lever 16, carrying with it the plunger $c$ and valve $d$. As the plunger $b$ leaves its seat 1 at the bottom of the cylinder O the area of the surface of the plunger $b$ upon which the receiver-pressure from pipe 17 acts is immediately increased, thus increasing the effective pressure upon the piston $b$ in such a manner that with a gradual start the speed is rapidly increased upon the plunger leaving its seat and exposing its full surface to the air-pressure beneath, and thus a rapid movement of the valve $d$ is secured immediately upon the start of the valve. This increase of pressure after starting the plunger $b$ acts also to overcome the increase in the effect of the weights $w$ due to the change in angularity of the weight-lever 16 as the lever is moved upward by the rod 14. This rapid upward movement of the valve *d* with piston *b* closes the ports 3 in rod 14 to the chamber 18 as the ports 3 move above the chamber, and the chamber 18 is connected through port 4, overlapping port 5, to the chamber 21, and thus through pipe 22 to the suction-chamber of the low-pressure cylinder A, and thus correspondingly reduces the pressure upon the backs of the discharge-valves *a* of the high-pressure cylinder. Upon this reduction of the pressure in chamber 18 and pipes 19 20 also the pressure in the top of the cylinder P is instantaneously reduced to the suction-pressure of the low-pressure cylinder A and the piston *c* in cylinder P immediately moves up under the excess of pressure from the intermediate receiver through pipe 24, acting upon the bottom of the valve *e*, and as this valve *e* leaves its seat 1 an increased pressure and rapid movement of the valve is secured, as in the case of the plunger *b*, so that the port 6 is at once closed to chamber 25, the intermediate-receiver pressure cut off, and the chamber 25 connected through ports 7 8 with the chamber 27, and thus through pipe 28 with the suction of cylinder A, so that the pressure upon the pistons on the backs of the discharge-valves of the low-pressure cylinder A is thus reduced to the suction-pressure of that cylinder. The pressure upon the discharge-valves of both cylinders A B, tending to hold them closed, being thus relieved, these valves remain open by reason of the greater pressure on the cylinder side, and the air in each of the compressor-cylinders A B is thus circulated back and forth through the passages K from one end of each cylinder to the other without any work being done. The load being thus removed from both pistons of the compressor, the compressor runs without doing work until a drop in the final-receiver pressure allows the weights *w* to move the rod 14 with its pistons *b c* and valve *d* downward, when the chamber 18 is again closed to the port 5 and opened to port 3 by the downward movement of the valve *d*, and the receiver-pressure from pipe 17 thus again admitted to pipes 19 20 and to the backs of the valves *a* of the high-pressure cylinder B, so as to again hold the valves closed, except as opened alternately by the pressure in the cylinder on the delivery side of the compressor-plunger and closed by the springs 12 in the regular operation of the compressor. The receiver-pressure is thus again admitted from pipe 20 through pipe 23 to the top of the cylinder P above the valve *e*, and the valve *e* is thus moved downward so as to again close chamber 25 to port 8 and connect it through port 6 with pipe 24, and thus admit the intermediate-receiver pressure through chamber 25 and pipe 26 to the back of the discharge-valves of the low-pressure cylinder A, and thus the normal operation of the low-pressure cylinder A is resumed. When the pressure in pipes 20 is reduced to the suction-pressure of cylinder A, as above described, the pressure in pipe 30, supplied through pipe 19, is correspondingly reduced, and thus the pressure in cylinder 31, tending to hold the valve 34 open, is relieved, so that the valve 34 is closed by spring 36 so far as permitted by the stop 37, and the supply of steam through valve 34 to the high-pressure cylinder B thus cut off or reduced to just the small amount desired to keep the engine running properly. When the receiver-pressure is again admitted to pipes 19 20 and the cylinders again loaded, as above described, the pressure in pipe 30 and cylinder 31 is correspondingly increased, and thus the pressure in cylinder 31, acting upon piston 32, opens the valve 34 against the pressure of spring 36 to admit the proper supply of steam for the compression-work.

While we have shown the unloading means as provided with piping through which the unloading connection is made with the suction-chamber of the low-pressure cylinder, it will be understood that this connection may be made directly to the atmosphere instead of through the suction-chamber, as shown; but we prefer to make the connection to the suction-chamber as shown, as the noise of an open exhaust is thus avoided and the very objectionable feature of the delivery of dirt and oil which accompanies such open exhaust. In the case of compressors for elastic fluids other than air this becomes still more important.

It will be understood that while the especial object of the invention is to provide efficient unloading means for multiple-stage air-compressors, and many features of the invention relate to such constructions, the unloading-cylinder constructions shown form in themselves parts of the invention and may be used in connection with single-stage air-compressors. Thus if only a high-pressure cylinder B be used it is obvious that the cross-pipe 23 will be omitted and the pipe 22 be connected to the suction-chamber of cylinder B or be open to the atmosphere, and that the construction on the high-pressure cylinder B then forms a complete unloading means for a single-stage air-compressor combined with a steam-regulator controlled by the unloading means.

In both multiple-stage and single-stage compressors it will be seen that a break in the final receiver or its connections will immediately result in relieving the pressure on the backs of the discharge-valves of both cylinders, so that both pistons will at once be unloaded, and a break in the intermediate receiver or its connections will at once result in unloading the low-pressure piston. In the two-stage compressor shown also it is evident that an excessive pressure in the intermediate receiver, if such should exist from any cause, will result in moving the plunger *e* against the final-receiver pressure, so as to unload the pistons of the low-pressure cylinder.

An important specific feature of the unloading cylinder and plunger construction shown, although not essential, is the seating of the plungers at the lower ends of the cylinders, and thus reducing the effective area of the plungers at the beginning of their movement, so that the start is gradual; but the effective area and speed rapidly increase upon the plungers leaving their seats, so as to secure a rapid opening by the valve of the connection between the pressure and exhaust chambers and overcome the increase in weight effect, which must result from change in angularity of the weight-lever. A very sensitive and rapid action of the unloading devices is thus secured.

While the invention has been shown as applied to a two-stage air-compressor—that is, one in which only two cylinders are employed—so as to secure two compressions, it will be understood that the invention is applicable generally in multiple-stage compressors and that as many cylinders and compressors may be used as desired, the final-receiver pressure and its release by the unloading means being applied in opposition to the pressure of the receiver to which each lower-pressure cylinder delivers to control the unloading of such cylinder in the same manner as shown and described in connection with cylinder A.

While the term "air-compressor" has been used throughout this specification and the term "air" applied to the fluid acted on, it will be understood that these terms are intended to apply to compressors for any elastic fluid other than air.

The broad invention of providing unloading devices for multiple-stage compressors may be applied in connection with unloading devices of widely-different forms from those shown and the desired control of the unloading of the lower-pressure pistons by the high and intermediate receiver pressures may be secured in different ways, and the more specific features of the invention are not to be limited to the exact form or arrangement of parts shown, but modifications may be made therein by those skilled in the art without departing from the invention.

What we claim is—

1. In a multiple-stage compressor, the combination with cylinders operating at different pressures, of a valve controlled by the final pressure, and means controlled by the movement of said valve for unloading the pistons of the different cylinders, substantially as described.

2. In a multiple-stage compressor, the combination with a high-pressure cylinder and low-pressure cylinder, of a valve controlled by the final pressure, and means controlled by the movement of said valve for unloading and loading the pistons of both cylinders including an unloading-valve for the low-pressure cylinder actuated by the receiver-pressure of the low-pressure cylinder, substantially as described.

3. In a multiple-stage compressor, the combination with a high-pressure cylinder and low-pressure cylinder, of a valve controlled by the final-receiver pressure, and means controlled by the movement of said valve for unloading the pistons of both cylinders including an unloading-valve subjected to the final-receiver pressure and the intermediate-receiver pressure tending to move the valve in opposite directions and means for relieving said final-receiver pressure for the movement of said unloading-valve by the intermediate-receiver pressure when the pistons are to be unloaded, substantially as described.

4. In a multiple-stage compressor, the combination with a high-pressure cylinder and low-pressure cylinder, of a valve controlled by the final-receiver pressure, means controlled by the movement of said valve for unloading and loading the piston of the high-pressure cylinder, a valve subjected to the final-receiver pressure and the intermediate-receiver pressure tending to move the valve in opposite directions, means controlled by said last-mentioned valve for unloading and loading the low-pressure cylinder, and connections controlled by the first-mentioned valve for applying the final-receiver pressure to said last-mentioned valve and relieving said pressure for unloading and loading the low-pressure piston when the high-pressure piston is unloaded and loaded, substantially as described.

5. In a multiple-stage compressor, the combination with the high-pressure cylinder and its unloading-valve controlled by the final-receiver pressure, of a low-pressure cylinder and an unloading-valve therefor the unloading movement of which is opposed by the final-receiver pressure, and means for applying and relieving the final-receiver pressure on the low-pressure unloading-valve by the unloading and loading movements of the high-pressure unloading-valve for unloading and loading the low-pressure piston, substantially as described.

6. In a multiple-stage compressor, the combination with a high-pressure cylinder and its unloading-valve controlled by the final-receiver pressure, of a low-pressure cylinder and an unloading-valve therefor, connections controlled by the high-pressure unloading-valve for applying the final-receiver pressure to the low-pressure unloading-valve, and connections for applying the intermediate-receiver pressure to the low-pressure unloading-valve in opposition to the final-receiver pressure, whereby the low-pressure unloading-valve is moved in one direction for unloading by the intermediate-receiver pressure and in the opposite direction for loading by the final-receiver pressure and the action of said low-pressure unloading-valve controlled by the high-pressure unloading-valve, substantially as described.

7. In a multiple-stage compressor, the combination with high and low pressure cylinders having discharge-valves subjected to fluid-pressure tending to close the valves and arranged to remain open for the circulation of fluid between opposite ends of the compressor-cylinders when said fluid-pressure is relieved, of a valve controlled by the final-receiver pressure, and means controlled by the movement of said valve for applying and releasing the fluid-pressure on the backs of the discharge-valves of both cylinders for loading and unloading the cylinder-pistons, substantially as described.

8. In a multiple-stage compressor, the combination with high and low pressure cylinders having discharge-valves subjected to fluid-pressure tending to close the valves and arranged to remain open for the circulation of fluid between opposite ends of the compressor-cylinders when said fluid-pressure is relieved, of a valve controlled by the final-receiver pressure, and means controlled by the movement of said valve for applying and releasing the fluid-pressure on the backs of the discharge-valves of both cylinders for loading and unloading the cylinder-pistons, including an unloading-valve for the low-pressure cylinder actuated by the receiver-pressure of the low-pressure cylinder, substantially as described.

9. In a multiple-stage compressor, the combination with high and low pressure cylinders having discharge-valves subjected to fluid-pressure tending to close the valves and arranged to remain open for the circulation of fluid between opposite ends of the compressor-cylinders when said fluid-pressure is relieved, of an unloading-valve for the high-pressure cylinder controlled by the final-receiver pressure, an unloading-valve for the low-pressure cylinder, connections controlled by the high-pressure unloading-valve for applying the final-receiver pressure to the low-pressure unloading-valve, connections for applying the intermediate-receiver pressure to the low-pressure unloading-valve in opposition to the final-receiver pressure, and means controlled by the movement of said valves for applying and releasing the fluid-pressure on the backs of the discharge-valves of both cylinders for loading and unloading the cylinder-pistons, substantially as described.

10. In a multiple-stage compressor, the combination with a low-pressure cylinder, of unloading means therefor including an unloading-valve subjected to a fluid-pressure tending to move the valve into its loading position and to the receiver-pressure of said cylinder tending to move the valve into unloading position, and means controlled by the final-receiver pressure for applying and relieving said fluid-pressure for loading and unloading the piston of said cylinder, substantially as described.

11. In a multiple-stage compressor, the combination with a low-pressure cylinder, of unloading means therefor including an unloading-valve subjected to the final-receiver pressure tending to move the valve into loading position and to the receiver-pressure of said cylinder tending to move the valve into unloading position, and means controlled by the final-receiver pressure for applying and relieving said final-receiver pressure for loading and unloading the piston of said cylinder, substantially as described.

12. In a multiple-stage compressor, the combination with a low-pressure cylinder, of unloading means therefor including a valve subjected on opposite sides to final-receiver pressure and the receiver-pressure of the low-pressure cylinder tending to move the valve into its loading and unloading positions, and a spring acting on said valve with the final-receiver pressure, substantially as described.

13. In a multiple-stage compressor, the combination with the cylinders operating at different pressures, of means for unloading the pistons of the different cylinders and controlling said unloading by the unloading of the high-pressure piston, substantially as described.

14. In a multiple-stage compressor, the combination with the cylinders operating at different pressures, of means for unloading and loading the pistons of the different cylinders and controlling said unloading and loading by the unloading and loading of the high-pressure piston, substantially as described.

15. In compressor-unloading means, a fluid-operated plunger controlling the unloading means and a seat therefor on which the plunger is normally seated and by which the effective area of the plunger is reduced in its normal position and increased at the beginning of its movement, substantially as described.

16. In compressor-unloading means, a fluid operated plunger controlling the unloading means and a seat therefor on which the plunger is normally seated and by which the effective area of the plunger is reduced in its normal position and increased at the beginning of its movement, in combination with a weighted lever moved by said plunger, substantially as described.

17. In compressor-unloading means, a fluid operated plunger and a seat therefor by which the effective area of the plunger is reduced in its normal position and increased at the beginning of its movement, and an unloading-valve actuated by the plunger with lost motion between the plunger and valve at the beginning of the plunger movement, substantially as described.

18. The combination with cylinder O, of plunger $b$ having seat 1, pipe 17 for admitting receiver-pressure below said plunger and valve $d$ seated in the cylinder above plunger $b$, substantially as described.

19. The combination with cylinder O, of plunger $b$ having seat 1, pipe 17 for admitting receiver-pressure below said plunger and valve $d$ having an enlarged head subjected to receiver-pressure and seated upon a shoulder in cylinder O, with space between the plunger and valve, substantially as described.

20. The combination with cylinder O and pressure-chamber 18, of valve $d$ having a head subjected to the pressure in chamber 18 to seat the valve, plunger $c$ on the opposite side of said chamber from the valve, and plunger $b$ for actuating the valve with lost motion between the plunger and valve, substantially as described.

21. The combination with cylinder O and pressure and exhaust chambers 18, 21, of plunger $b$ and rod 14 having ports 2, 3, and valve $d$ having port 4 for connecting the pressure and exhaust chambers, substantially as described.

22. The combination with cylinder P, of valve $e$ having seat 1 therein, unloading-ports controlled by said valve, pipe 24 for applying intermediate-receiver pressure to said valve, and pipe 23 for applying fluid-pressure in opposition to said intermediate-receiver pressure, substantially as described.

23. The combination with cylinder P, of valve $e$, unloading-ports controlled by said valve, pipe 24 for applying intermediate-receiver pressure to said valve, and pipe 23 connecting with the final receiver for applying said final-receiver pressure in opposition to said intermediate-receiver pressure, substantially as described.

24. The combination with cylinder P, of valve $e$, unloading-ports controlled by said valve, pipe 24 for applying intermediate-receiver pressure to said valve, pipe 23 connecting with the final receiver for applying said final-receiver pressure in opposition to said intermediate-receiver pressure, and spring 29 acting with the final-receiver pressure, substantially as described.

25. The combination with low and high pressure cylinders A, B, of cylinders O, P, a high-pressure unloading-valve in cylinder O controlled by the final-receiver pressure, a low-pressure unloading-valve in cylinder P, pipe 24 connecting cylinder P with the intermediate receiver, and pipe 24 controlled by the high-pressure unloading-valve for applying final-receiver pressure to said low-pressure valve in opposition to the intermediate-receiver pressure, substantially as described.

In testimony whereof we have hereunto set our hands in the presence of two subscribing witnesses.

GEORGE DE LAVAL.
GEORGE P. ABORN.

Witnesses:
JOHN J. FINLEY,
ALVAH F. DOLE.